US010425545B2

(12) United States Patent
Hirouchi (10) Patent No.: US 10,425,545 B2
(45) Date of Patent: Sep. 24, 2019

(54) PRINTING APPARATUS AND METHOD FOR CONTROLLING THE SAME

(71) Applicant: CANON KABUSHIKI KAISHA, Tokyo (JP)

(72) Inventor: Yasuo Hirouchi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/842,622

(22) Filed: Dec. 14, 2017

(65) Prior Publication Data

US 2018/0183962 A1    Jun. 28, 2018

(30) Foreign Application Priority Data

Dec. 22, 2016    (JP) .................................. 2016-249171

(51) Int. Cl.
| | |
|---|---|
| *G06K 15/00* | (2006.01) |
| *H04N 1/00* | (2006.01) |
| *G06F 1/26* | (2006.01) |
| *G06F 1/3234* | (2019.01) |

(52) U.S. Cl.
CPC ......... *H04N 1/00891* (2013.01); *G06F 1/266* (2013.01); *G06F 1/3284* (2013.01); *H04N 1/00907* (2013.01); *H04N 2201/0082* (2013.01); *Y02D 10/159* (2018.01)

(58) Field of Classification Search
CPC ... G06F 1/266; G06F 1/3284; H04N 1/00907; H04N 2201/0082; H04N 2201/0094
See application file for complete search history.

(56) References Cited

U.S. PATENT DOCUMENTS

| 6,845,457 | B1 * | 1/2005 | Mirov ...................... G06F 1/08 |
| | | | 713/320 |
| 8,307,127 | B1 * | 11/2012 | Zeng ..................... G06F 13/385 |
| | | | 710/22 |
| 2004/0078663 | A1 * | 4/2004 | Inaba ...................... G06F 1/266 |
| | | | 714/22 |
| 2006/0271802 | A1 | 11/2006 | Yanagawa |
| 2008/0141050 | A1 * | 6/2008 | Senda ................ H04N 1/00127 |
| | | | 713/321 |
| 2008/0313493 | A1 | 12/2008 | Roohparvar |

(Continued)

FOREIGN PATENT DOCUMENTS

| CN | 101681284 A | 3/2010 |
| CN | 103853682 A | 6/2014 |

(Continued)

*Primary Examiner* — Moustapha Diaby
(74) *Attorney, Agent, or Firm* — Canon U.S.A., Inc. IP Division (57) ABSTRACT

An image processing apparatus according to the present disclosure may operate in a normal state and a power saving state in which power consumption is smaller than that in the normal state. The image processing apparatus includes a detection unit which detects attachment of a detachable device to the image processing apparatus and detachment of the device from the image processing apparatus and a controller which controls execution of an interruption process in response to the attachment or the detachment of the device detected by the detection unit. The controller brings the image processing apparatus from the normal state to the power saving state after causing the detection unit not to perform the detection.

15 Claims, 5 Drawing Sheets

(56) References Cited

U.S. PATENT DOCUMENTS

| | | | |
|---|---|---|---|
| 2009/0313493 A1* | 12/2009 | Ide | G06F 1/3203 |
| | | | 713/323 |
| 2012/0159212 A1* | 6/2012 | Takatani | G03G 15/5079 |
| | | | 713/320 |
| 2013/0031392 A1* | 1/2013 | McLane | G06F 1/3278 |
| | | | 713/323 |
| 2013/0215020 A1* | 8/2013 | Matsuda | G06F 3/03 |
| | | | 345/157 |
| 2013/0222833 A1 | 8/2013 | Hirano | |

FOREIGN PATENT DOCUMENTS

| | | |
|---|---|---|
| EP | 2738642 A1 | 6/2014 |
| JP | 2011008688 A | 1/2011 |
| JP | 2013-176878 A | 9/2013 |
| JP | 2015-098096 A | 5/2015 |
| WO | 2007/013512 A1 | 2/2007 |

* cited by examiner

PRINTING APPARATUS AND METHOD FOR CONTROLLING THE SAME

BACKGROUND OF THE INVENTION

Field of the Invention

The present disclosure relates to a printing apparatus connected to a device detachable by a user.

Description of the Related Art

Printing apparatuses which enter a power saving state of low power consumption from a normal state when an operation is not performed for a predetermined period of time are widely used. Before such a printing apparatus enters the power saving state, a suspending process of storing setting values of devices included in the printing apparatus in a memory is performed. Subsequently, power consumption is reduced in the power saving state by stopping supply of electric power to a number of the devices. Thereafter, before the printing apparatus returns from the power saving state to the normal state, the setting values stored in the memory are read and set to the devices. In this way, the consumed power is reduced in the power saving state and the power saving state is restored to the state as before the power saving state.

When the printing apparatus executes the suspending process, a device connected to the printing apparatus may request execution of an interruption process having a priority level higher than that of the suspending process. The interruption process is performed when writing to the device connected to the printing apparatus is completed, for example. Here, the printing apparatus stops the suspending process so as to execute the interruption process, and therefore, the state of the printing apparatus may not be changed to the power saving state.

Japanese Patent Laid-Open No. 2011-8688 discloses a technique of not executing an interruption process in a case where execution of the interruption process is requested by a device incorporated in an apparatus during a suspending process.

A general image processing apparatus may be used with a device, such as a universal serial bus (USB) device attached thereto, which is detachable by a user. When such a device is attached to the image processing apparatus, the image processing apparatus performs an interruption process so as to start communication with the device. On the other hand, when the device is detached from the image processing apparatus, the image processing apparatus executes an interruption process so as to terminate the communication with the device.

In Japanese Patent Laid-Open No. 2011-8688, the interruption process is not taken into consideration when a detachable device is attached to or detached from the image processing apparatus.

Therefore, while the image processing apparatus executes a suspending process, the interruption process caused by attachment or detachment of the device is preferentially executed if the user attaches the device to or detaches the device from the image processing apparatus. As a result of executing the interruption process, the suspending process is interrupted, and the image processing apparatus does not enter the power saving state.

SUMMARY OF THE INVENTION

The present disclosure provides a process of preventing the interruption process from being performed when a device is attached or detached to the image processing apparatus by a user during a suspending process and entering a power saving state of the image processing apparatus.

An image processing apparatus according to the present disclosure may operate in a normal state and a power saving state in which power consumption is smaller than that in the normal state. The image processing apparatus includes a detection unit which detects attachment of a detachable device to the image processing apparatus and detachment of the device from the image processing apparatus and a controller which controls execution of an interruption process in response to the attachment or the detachment of the device detected by the detection unit. The controller brings the image processing apparatus from the normal state to the power saving state after causing the detection unit not to perform the detection.

Further features of the present invention will become apparent from the following description of exemplary embodiments with reference to the attached drawings.

DESCRIPTION OF THE EMBODIMENTS

Hereinafter, preferred embodiments of the present disclosure will be described with reference to the accompanying drawings. Note that the embodiments below do not limit the present disclosure associated with the scope of the claims below, and it is not necessarily the case that all combinations of characteristics described in the embodiments are required for solving problems of the present disclosure.

First Embodiment

Figure 1:
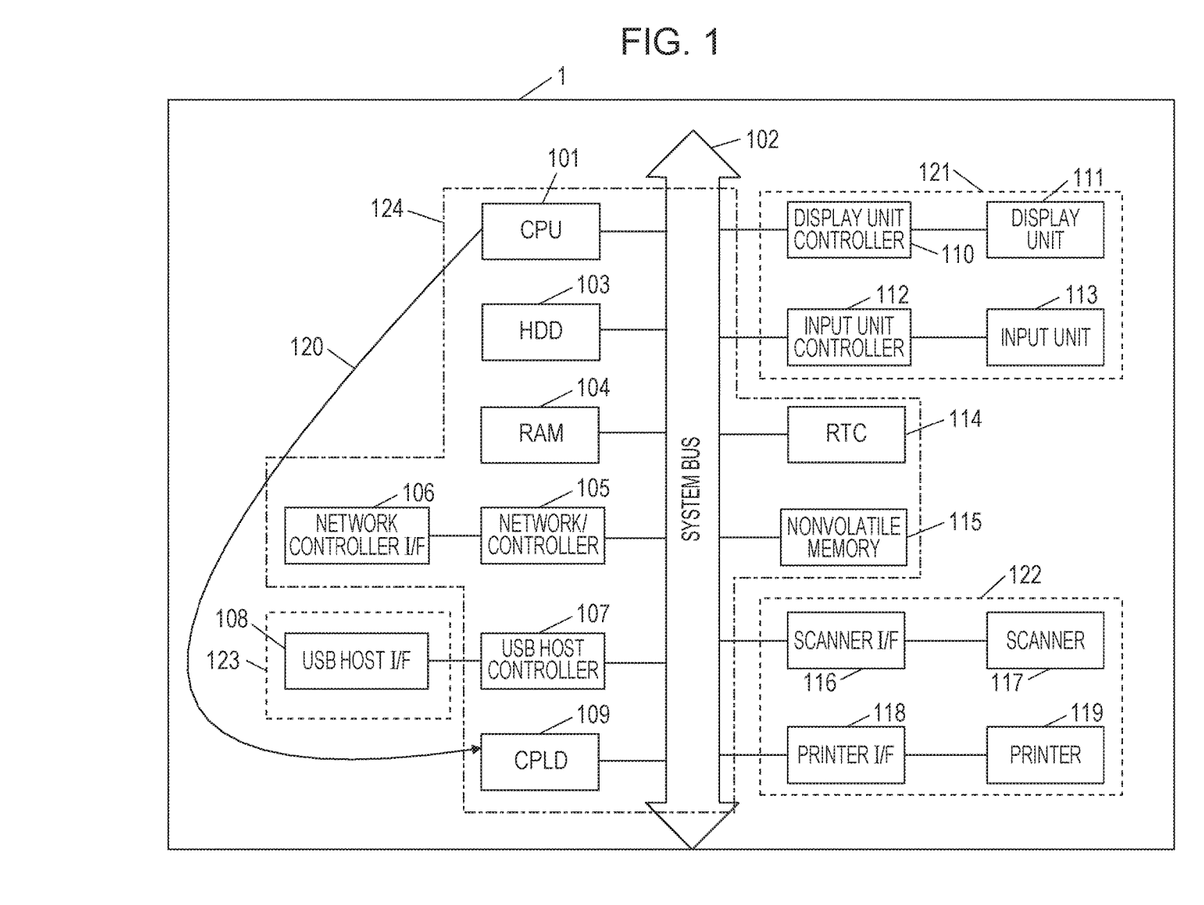
FIG. 1 is a diagram illustrating a hardware configuration of an image processing apparatus.

FIG. 1 is a diagram illustrating a hardware configuration of an image processing apparatus 1. The configuration of the image processing apparatus 1 will be described with reference to FIG. 1.

A central processing unit (CPU) 101 is a central processing arithmetic apparatus which operates software for operating the image processing apparatus 1. A system bus 102 is a path used when the CPU 101 accesses other units or when the other units transmit and receive information with one another.

A hard disk unit (HDD) 103 operates as a storage region which stores the software of the image processing apparatus 1 and databases and files required for operating the image processing apparatus 1. Although the HDD is used as the storage region, in this embodiment, a large-capacity non-volatile memory, such as a solid state drive (SSD), may be used. A random access memory (RAM) 104 is a memory having a region in which a program of the image processing apparatus 1 is developed. Furthermore, the RAM 104 operates as a storage region which stores variables used for operating programs and data to be transferred from the units by dynamic memory access (DMA).

A network controller 105 is used when the image processing apparatus 1 performs communication with other devices on a network. A network controller interface (I/F) 106 is used to connect the network controller 105 with the network.

A USB host controller 107 controls communication between the image processing apparatus 1 and a USB device. A USB host I/F 108 is used for connection between the USB host controller 107 and an external USB device. The USB host controller 107 performs device control for controlling a USB device 206. Although only one USB host controller 107 is illustrated in FIG. 1, a plurality of USB host controllers 107 may be provided. The image processing apparatus 1 and an external USB device are connected to each other through the USB host I/F 108 and a USB cable, not illustrated. The USB device may be directly connected to the image processing apparatus 1 without using the USB cable depending on a form of the USB device.

A display unit 111 is a display device which displays an operation state of the image processing apparatus 1 so that the user can check the operation state. A display unit controller 110 performs display control of the display unit ill.

An input unit 113 is an input device which receives an instruction issued by the user to the image processing apparatus 1. An input unit controller 112 controls the input unit 113. The input unit 113 is an input device including a keyboard, a mouse, a numeric keypad, a cursor key, a touch panel, and an operation unit keyboard. Furthermore, in a case where the input unit 113 is a touch panel, the touch panel is overlapped with a surface of the display unit 111, and the touch panel and the display unit 111 are integrated.

A real time clock (RTC) 114 has a clock function, an alarm function, a timer function, and the like of the image processing apparatus 1.

A nonvolatile memory 115 is a non-rewritable nonvolatile storage medium. A static random access memory (SRAM), an electrically-erasable programmable read only memory (EEPROM), or the like is used as the nonvolatile memory.

A complex programmable logic device (CPLD) 109 is a program-rewritable logic device. The CPLD 109 executes a process when the CPU 101 reads a low (0)/high (1) state of a signal line on a base circuit or changes a setting of the low (0)/high (1) state. In this embodiment, the CPLD 109 enables control of ON/OFF of electric power of the image processing apparatus 1. A general-purpose input/output (GPIO) is included in the CPLD 109. When the CPU 101 changes a setting value of a register of the GPIO, ON/OFF of power supply to various blocks in the image processing apparatus 1 is enabled.

The image processing apparatus 1 is connected to a scanner 117 through a scanner I/F 116. The scanner 117 operates as a reading unit. Furthermore, the image processing apparatus 1 is connected to a printer 119 through the system bus 102 and a printer I/F 118. The printer 119 functions as a printing unit.

The image processing apparatus 1 includes a first block which constantly maintains an energized state after power is on and second blocks which are not energized when a power saving state is entered. The CPLD 109 controls an energized state of the first and second blocks. The first block is surrounded by a dotted line 124 in FIG. 1 and constantly energized after power is on. On the other hand, the second blocks are surrounded by dotted lines 121, 122, and 123 and energized as normal and not energized due to stop of power supply when the power saving state is entered. After a general-purpose OS terminates a suspending process of a system, the CPU 101 transmits a signal 120 which notifies the CPLD 109 of completion of the suspending process. When receiving the signal 120 indicating the completion of the suspending process, the CPLD 109 performs a process of stopping power supply to the second blocks 121, 122, and 123.

Figure 2:
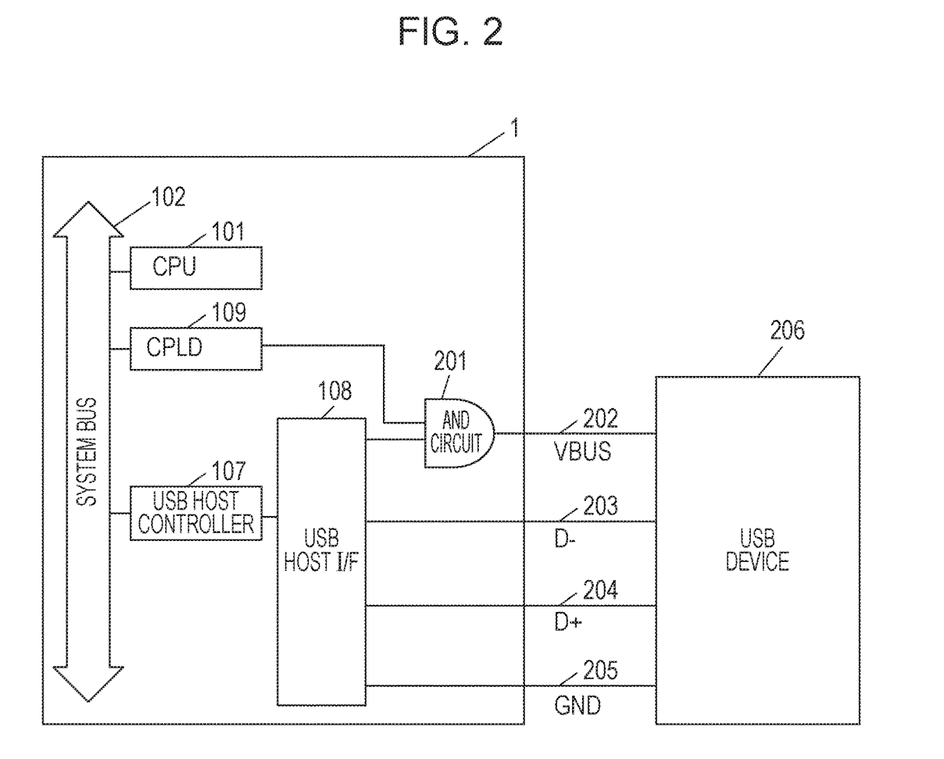
FIG. 2 is a diagram illustrating a hardware configuration for controlling power supply to a USB device.

FIG. 2 is a circuit configuration which realizes control of power supply to a USB device connected to the image processing apparatus 1.

The USB device 206 communicates with the USB host controller 107 through four signal lines. A VBUS 202 is a power line used when the image processing apparatus 1 supplies electric power to the USB device 206. A signal line D− 203 and a signal line D+ 204 are used to supply data between the USB device 206 and the USB host controller 107. A GND 205 indicates a ground signal line.

An AND circuit 201 controls output by obtaining a logical AND of an output of the GPIO of the CPLD 109 and an output of the VBUS of the USB host I/F 108. In a case where the output of the AND circuit 201 is 1, the image processing apparatus 1 supplies electric power to the USB device 206, and otherwise, the power supply is not performed. In this embodiment, a state in which an output of the GPIO of the CPLD 109 is changed from 1 to 0 and an output of the AND circuit 201 is 0 irrespective of an output of the USB host I/F 108 is referred to as "disconnection of the VBUS". On the other hand, a state in which an output of the GPIO of the CPLD 109 is changed from 0 to 1 and an output of the VBUS 202 when the USB device 206 is attached to the image processing apparatus 1 is 1 is referred to as "connection of the VBUS".

In this embodiment, an output of the VBUS of the USB device 206 is controlled using the AND circuit 201. However, an output of the VBUS 202 of the USB device 206 may be controlled using another general logic circuit. For example, an output of the VBUS 202 may be controlled using a high-side switch and an OR circuit.

Here, a flow of transition from the normal state to the power saving state of the image processing apparatus 1 of this embodiment will be described with reference to FIG. 2.

When a predetermined period of time has elapsed after end of a job or when a predetermined period of time has elapsed after a latest input received by the input unit 113, the image processing apparatus 1 is switched to the power saving state. Specifically, the RTC 114 manages an elapsed time after a latest job is executed and a period of time after a latest input is received. When a period of time measured by the RTC 114 reaches a predetermined period of time, the normal state of the image processing apparatus 1 is switched to the power saving state.

When the normal state of the image processing apparatus 1 is switched to the power saving state, the CPU 101 changes an output of the GPIO of the CPLD 109 from 1 to 0. In this case, the AND circuit 201 outputs 0 irrespective of an output of the USB host I/F 108. By this, power supply to the VBUS 202 is stopped and the communication between the image processing apparatus 1 and the USB device 206 is stopped.

In a case where the USB device 206 is not connected to the image processing apparatus 1, after power supply to the VBUS is stopped, the image processing apparatus 1 executes the suspending process without performing an interruption process to be performed in response to detachment of the USB device 206. The suspending process includes a process of storing setting values of various devices controlled by corresponding device drivers and setting values indicating states of the drivers in a nonvolatile memory.

If the USB device 206 is connected to the image processing apparatus 1, the image processing apparatus 1 executes an interruption process to be performed when the VBUS is disconnected after stopping the power supply to the VBUS 202. The process to be performed when the VBUS is disconnected corresponds to a process to be executed when the USB device 206 is detached. The process to be executed when the USB device 206 is detached will be described below with reference to FIG. 6. After the interruption process performed in response to the disconnection of the VBUS 202 is completed, the CPU 101 executes the suspending process.

In this embodiment, the image processing apparatus 1 stops power supply to the VBUS 202, executes the interruption process that is performed when the USB device 206 is detached, and performs the suspending process. By this, even if the user attaches or detaches the USB device 206 while the suspending process is executed, the interruption process is not executed.

First, the interruption process performed when the USB device 206 is attached to the image processing apparatus 1 and the interruption process performed when the USB device 206 is detached will be described with reference to FIGS. 5 and 6.

Figure 5:
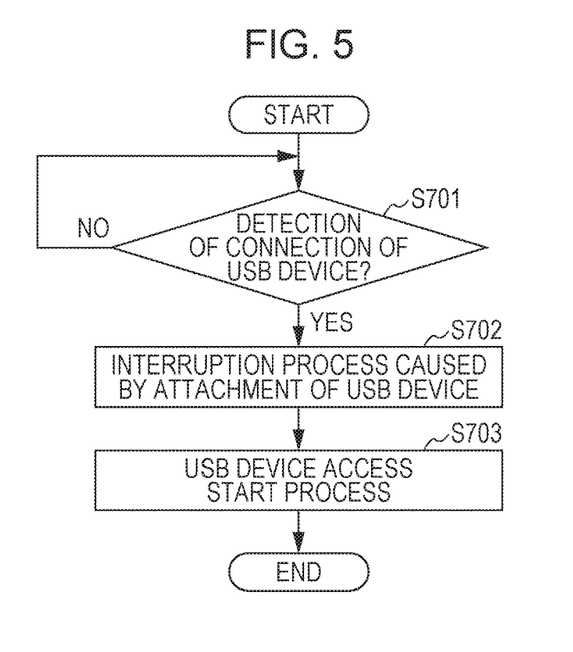
FIG. 5 is a flowchart of a process performed when the USB device is attached to the image processing apparatus in the normal state.

FIG. 5 is a flowchart of the interruption process performed when the USB device 206 is attached to the image processing apparatus 1. A program for executing the process of this flowchart is stored in the HDD 103 of the image processing apparatus 1, and the process is realized when the CPU 101 executes the program.

The CPU 101 determines whether the USB device 206 has been attached (S701). When the USB device 206 is attached to the image processing apparatus 1, the four signal lines, that is, the VBUS 202, the signal line D− 203, the signal line D+ 204, and the GND 205, are connected to the image processing apparatus 1. Thereafter, electric power is supplied from the image processing apparatus 1 to the USB device 206 through the VBUS 202. When the electric power is supplied to the USB device 206 and differential signals of the signal line D− 203 and the signal line D+ 204 are operated, the USB host controller 107 recognizes the USB device 206 and the CPU 101 determines that a USB device is connected.

The CPU 101 receives a request for performing the interruption process in response to the attachment of the USB device 206 from the USB host controller 107 and executes the interruption process (S702). The CPU 101 communicates with the USB device 206 so as to execute an enumeration process for analyzing a specification and a configuration of the USB device 206. Here, the CPU 101 requests the USB device 206 to transmit a descriptor indicating the specification, such as a type or a function, of the USB device 206. The CPU 101 may determine a function of the connected USB device 206 by analyzing the received descriptor. The CPU 101 associates the USB device 206 with a device driver corresponding to the USB device 206 based on information obtained by the analysis and stores a result of the association in the RAM 104.

The CPU 101 executes a process of realizing the function of the connected USB device 206 (S703). In step S702, for example, if the connected USB device 206 is in a storage class and functions as a storage device, a process for enabling access to the USB device 206 is performed through a storage class driver. By performing this process, the USB device 206 may be mounted on the image processing apparatus 1 and access to folders and data in the connected USB device 206 is enabled through a file system. Furthermore, in step S702, if the connected USB device 206 is an input type, such as a USB card reader, a notification indicating the connection of the card reader is transmitted to application software and a process for performing reading/writing of data from the card reader is executed.

Figure 6:
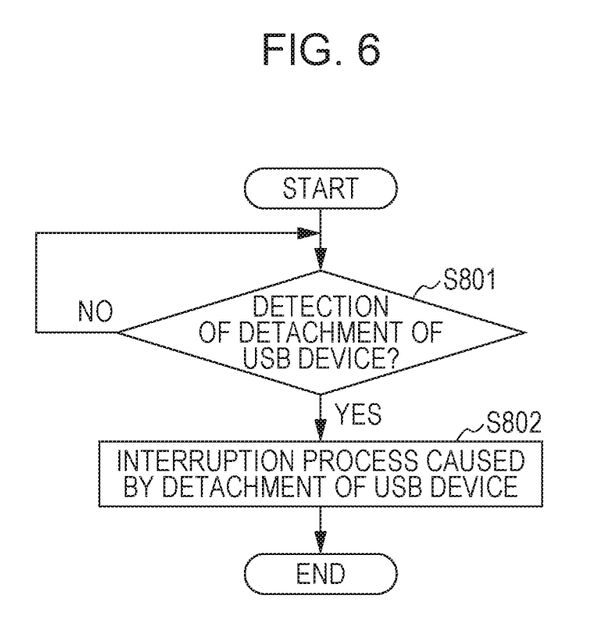
FIG. 6 is a flowchart of a process performed when the USB device is detached from the image processing apparatus in the normal state.

FIG. 6 is a flowchart of the process performed when the USB device 206 is detached from the image processing apparatus 1. A program for executing the process of the flowchart of FIG. 6 is stored in the HDD 103 of the image processing apparatus 1, and the process is realized when the CPU 101 executes the program.

The CPU 101 determines whether the USB device 206 has been detached (S801). When the USB device 206 is detached from the image processing apparatus 1, the VBUS 202, the signal line D− 203, the signal line D+ 204, and the GND 205 are not connected. Since the signal lines are brought to a non-connection state, transmission and reception of a signal may not be performed between the image processing apparatus 1 and the USB device 206. The USB host controller 107 detects the detachment of the USB device 206 and transmits a notification indicating the detachment of the USB device 206 to the CPU 101. When receiving the notification, the CPU 101 determines that the USB device 206 has been detached from the image processing apparatus 1.

In step S801, when it is determined that the USB device 206 has not been detached, the CPU 101 executes the process of step S801 again.

In step S801, when it is determined that the USB device 206 has been detached, the CPU 101 executes the interruption process to be performed when the USB device 206 is detached (S802). Here, the CPU 101 cancels the association between the USB device 206 and the device driver performed in step S702. Since the association between the USB device 206 and the device driver is cancelled, any application may not access the USB device 206.

In FIG. 6, a process performed after the USB device 206 is detached from the image processing apparatus 1 is described. In a case where the USB device 206 attached to the image processing apparatus 1 is a storage device, if the USB device 206 is detached from the image processing apparatus 1 in a state in which the USB device 206 is mounted on the image processing apparatus 1, the file system in the image processing apparatus 1 may be destroyed. Therefore, before the USB device 206 is detached from the image processing apparatus 1, a process of stopping access from the image processing apparatus 1 to the USB device 206 is required to be performed.

The process of stopping access from the image processing apparatus 1 to the USB device 206 is started when an instruction for starting the process is received from the user. The user inputs an instruction for performing unmounting using a screen displayed in the display unit 111 and the input unit 113 so that access from the image processing apparatus 1 to the USB device 206 is stopped. When receiving the input, the CPU 101 unmounts the file system mounted in step S702. By performing this process, the storage device may be detached from the image processing apparatus 1 without destroying the file system.

Figure 3:
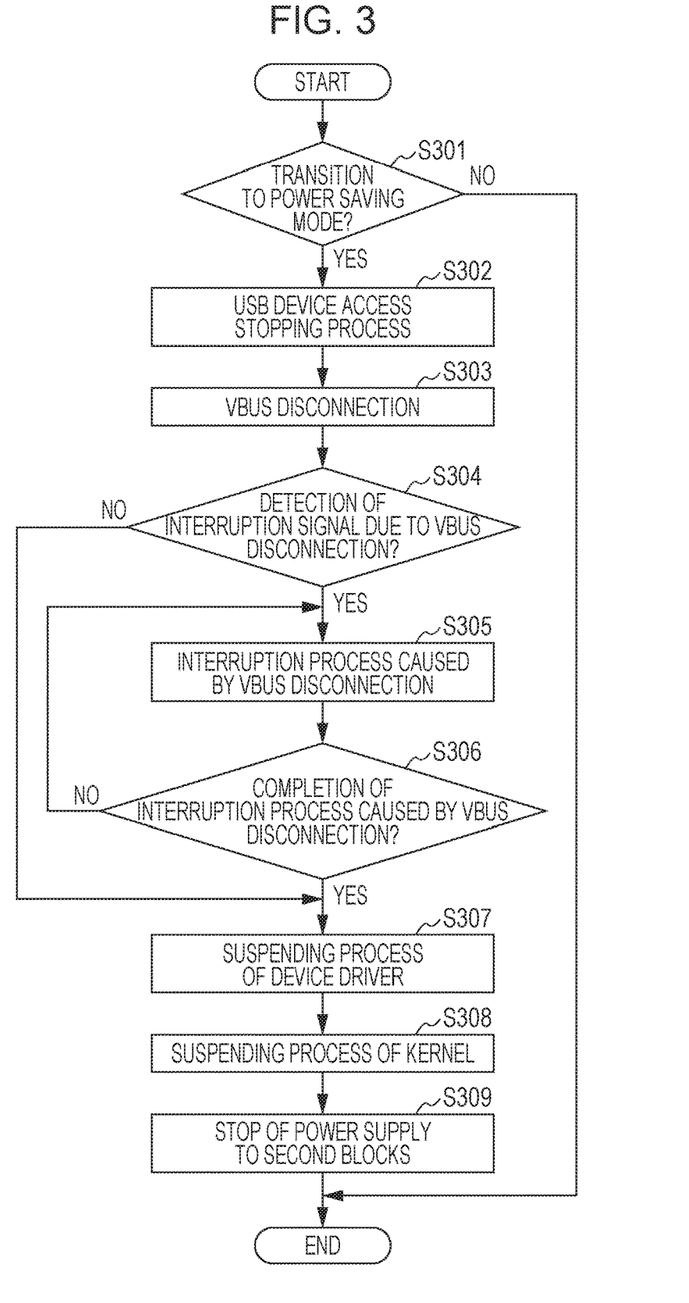
FIG. 3 is a flowchart of a process performed when the image processing apparatus enters a power saving state.

FIG. 3 is a flowchart of a process performed when the normal state of the image processing apparatus 1 is switched to the power saving state. The process in FIG. 3 is realized when the CPU 101 executes a program stored in the HDD 103 or the like.

The CPU 101 starts the process of the flowchart in FIG. 3 when the RTC 114 detects that a predetermined period of time has elapsed after a latest job is terminated or that a predetermined period of time has elapsed after a latest input to the input unit 113 is performed.

The CPU 101 determines whether the image processing apparatus 1 may enter the power saving state (S301). Here, the CPU 101 makes an inquiry indicating whether various software modules including a software module controlling the printer 119 and a software module controlling the scanner 117 which operate in the image processing apparatus 1 may enter the power saving state. A state in which such a software module may not enter the power saving state corresponds to a case where the software module is executing another process, for example. The image processing apparatus 1 proceeds to step S302 when all the modules which receive the inquiry may enter the power saving state. If at least one of the software modules may not enter the power saving state, the CPU 101 determines that the image processing apparatus 1 may not enter the power saving state and terminates the process in FIG. 3.

When the determination is affirmative in step S301, the CPU 101 requests the software module which controls the USB host controller 107 to perform a process of stopping access to the USB device 206 (S302). When receiving a signal from the CPU 101, the software module which controls the USB host controller 107 executes the process of stopping the access to the USB device 206 connected to the image processing apparatus 1. If a USB storage is connected to the image processing apparatus 1, the mounting is cancelled so that access by the CPU 101 to the USB storage through the file system is prohibited. Furthermore, if a USB device, such as a USB card reader is connected, an instruction for stopping execution of a process of reading information from the USB card reader and writing information to the USB card reader is issued to application software which executes the process.

After the process of access to the USB device 206 is stopped in step S302, the CPU 101 disconnects the VBUS 202 (S303). The CPU 101 operates the register of the GPIO included in the CPLD 109 so as to cause a signal line which connects the CPLD 109 with the AND circuit 201 to output 0. The CPLD 109 outputs a signal of 0 even though the USB host controller 107 is in operation and the output is 1, and therefore, an output of the VBUS 202 corresponding to an output from the AND circuit 201 is 0. When the VBUS 202 outputs 0, even if the USB device 206 is physically connected to the image processing apparatus 1, the USB device 206 is electrically disconnected from the image processing apparatus 1.

The CPU 101 determines whether the interruption process to be performed in response to the disconnection of the VBUS 202 has been detected (S304). In step S303, in a case where the USB device 206 is connected while the VBUS 202 is disconnected, the image processing apparatus 1 and the USB device 206 are electrically disconnected and an interruption signal which requests the interruption process for terminating the communication is generated. On the other hand, in step S303, in a case where the USB device 206 is not connected when the VBUS is disconnected, the interruption signal is not generated even if the VBUS 202 is disconnected. When the interruption signal is not detected until a predetermined period of time has elapsed, the CPU 101 proceeds to step S307 described below.

When the interruption signal is detected in step S304, the CPU 101 executes the interruption process to be performed in response to the disconnection of the VBUS (S305). The process executed in step S305 is the same as the interruption process to be performed when the USB device 206 is detached from the image processing apparatus 1.

The CPU 101 determines whether the interruption process is completed (S306). When the determination is negative, the CPU 101 repeatedly performs the process in step S305 and step S306.

After the interruption process is terminated, the CPU 101 performs the suspending process of the device drivers of the general-purpose OS (S307). In step S307, the CPU 101 performs a process of storing register information of hardware which is used by the device drivers in operation and state variables indicating states of the various devices in a nonvolatile memory.

After the suspending process of the device drivers is completed, the CPU 101 executes the suspending process of a kernel of the general-purpose OS (S308). In step S308, the CPU 101 performs a process of storing register information of hardware which is used by the kernel in operation and a state variable indicating a state of the hardware in the nonvolatile memory. When the device drivers and the kernel enter the suspending state, the CPU 101 outputs a suspending completion signal to the CPLD 109.

When receiving the suspending completion signal from the CPU 101, the CPLD 109 stops power supply to the second blocks 121, 122, and 123 (S309).

Figure 4:
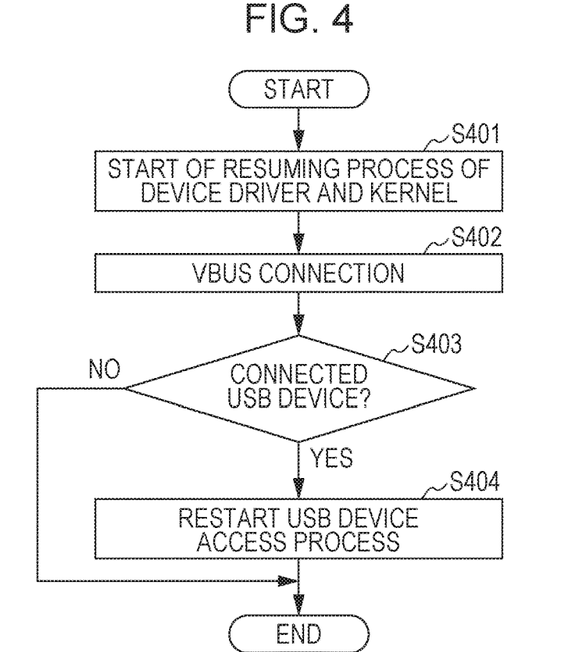
FIG. 4 is a flowchart of a process performed when the image processing apparatus is restored to a normal state.

FIG. 4 is a flowchart of a process performed when the power saving state of the image processing apparatus 1 is switched to the normal state. The process in FIG. 4 is realized when the CPU 101 executes a program stored in the HDD 103 or the like.

The image processing apparatus 1 starts a process of restoration from the power saving state to the normal state when detecting that a job is input from an external apparatus, such as a PC, connected through a network or when detecting that a predetermined button included in the image processing apparatus 1 is pressed. Specifically, the CPLD 109 transmits a signal for restoration to the CPU 101 when an input of a job or press of a predetermined button is detected.

The process illustrated in FIG. 4 is started when the CPU 101 receives the restoration signal from the CPLD 109. The CPLD 109 restarts the power supply to the second blocks 121, 122, and 123 in which the power supply thereto is stopped in step S308 of FIG. 3.

When receiving the restoration signal from the CPLD 109, the CPU 101 performs a resuming process of the kernel and the device drivers of the general-purpose OS (S401). In step S401, the CPU 101 reads the register information of the hardware and the state variables which are stored in step S306 and step S307 of FIG. 3 and performs a process of writing the information and the state variables in the registers of the devices and the like.

After the resuming process of the kernel and the device drivers of the general-purpose OS is completed, the CPU 101 operates the register of the GPIO included in the CPLD 109 so as to cause the CPLD 109 to output 1 (S402).

In a case where the USB device 206 is attached to the image processing apparatus 1, the AND circuit 201 outputs 1 and electric power is supplied to the USB device 206. When the electric power is supplied to the VBUS 202 of the USB device 206, the USB device 206 and the image processing apparatus 1 may communicate with each other.

In step S402, when the USB device 206 is not attached to the image processing apparatus 1, the VBUS 202 continuously outputs 0.

After the CPU 101 changes a value of the GPIO of the CPLD 109 to 1, the CPU 101 determines whether the USB device 206 is connected to the image processing apparatus 1 (S403). Here, the CPU 101 detects an interruption signal generated when the USB device 206 is attached to the image processing apparatus 1. When detecting the interruption signal, the CPU 101 determines that the USB device 206 is connected to the image processing apparatus 1. When the USB device is connected, the CPU 101 performs an interruption process for starting communication with the USB device and proceeds to step S404. When the CPU 101 does not detect an interruption signal, the CPU 101 determines that the USB device is not connected to the image processing apparatus 1 and terminates the process in FIG. 4. In step S403, the process of determining whether the USB device is attached to the image processing apparatus 1 is not limited to the process described above.

When it is determined that the USB device 206 is connected to the image processing apparatus 1 in step S403, the CPU 101 performs a process of restarting access to the USB device 206 (S404). When the USB device 206 is a USB storage, a mounting process is executed so that the CPU 101 may access the USB storage through the file system. Furthermore, when an input-type USB device, such as a USB card reader, is connected, a notification indicating connection of the card reader is transmitted to application software so that a writing process and a reading process may be performed on the USB card reader.

After the process in step S404 is executed, the image processing apparatus 1 terminates the process in the flowchart of FIG. 4.

By executing the process described above, an interruption process to be performed when the user performs attachment or detachment of a device, such as a USB device, is prevented from being performed during the suspending process of the image processing apparatus 1. Accordingly, the image processing apparatus 1 may perform power control so that the normal state is switched to the power saving state.

Furthermore, termination of the interruption process performed in response to the disconnection of the VBUS 202 is detected after the VBUS 202 is disconnected, and thereafter, the suspending process is executed on a device corresponding to a device driver of the image processing apparatus 1. Accordingly, a case where the image processing apparatus 1 is prevented from entering the power saving state because the interruption process in response to disconnection of the VBUS 202 and the suspending process are simultaneously performed is prevented from occurring.

Other Embodiments

In the first embodiment, it is determined whether an interruption signal has generated in response to disconnection of the VUBS 202 in step S304 of FIG. 3. When an interruption signal is detected, the process in step S305 and step S306 is executed. However, instead of the detection of an interruption signal performed in step S304, it is determined whether a USB device is connected before a VBUS is disconnected.

The CPU 101 recognizes that the USB device 206 is attached to the image processing apparatus 1 and stores information indicating that the USB device 206 is attached to the image processing apparatus 1 in the RAM 104. When the CPU 101 determines that the USB device 206 is connected before the disconnection of the VBUS with reference to the information stored in the RAM 104, the process in step S305 and step S306 is executed. On the other hand, if a USB device is not connected to the image processing apparatus 1 before disconnection of the VBUS, a process from S307 onwards is executed.

The present disclosure is applicable to interfaces other than a USB including FIREWIRE (registered trademark).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-249171 filed Dec. 22, 2016, which is hereby incorporated by reference herein in its entirety.

What is claimed is:

1. A printing apparatus operable to control a removable device and operable in a first power state and in a second power state, wherein power consumption in the second power state being lower than power consumption in the first power state, comprising:
   an interface to which the removable device is configured to be attached;
   a controller configured to acquire information regarding a device driver of the removable device, wherein the information acquired by the controller regarding the device driver is register status of hardware controlled by the device driver;
   a first memory configured to store the information acquired by the controller regarding the device driver in a suspending process of the device driver by the controller;

a power supply unit configured to supply power to the removable device attached to the interface;

a power controller configured to stop power supply to the removable device by the power supply unit; and a second memory different from the first memory and configured to, upon attachment of the removable device to the interface, store information, acquired by the controller, of the removable device and of the device driver to control the removable device, wherein the controller executes a predetermined process in response to a stop of power supply to the removable device, wherein the predetermined process is processing for clearing the information of the removable device and of the device driver stored in the second memory, and wherein, on a basis of a request for shifting to the second power state from the first power state, the power controller stops power supply to the removable device, and then the controller acquires the information regarding the device driver and stores the information into the first memory.

2. The printing apparatus according to claim 1,
wherein the controller performs a process of stopping access to the removable device in accordance with the request for shifting to the second power state, and the power controller stops power supply to the device after the stopping process is executed and before the information regarding the device driver is acquired.

3. The printing apparatus according to claim 1,
wherein the second power state is a state in which power is not supplied to the interface, and the power controller stops power supply to the interface upon completion of a suspending process of an operation system.

4. The printing apparatus according to claim 1, further comprising:
a display unit,
wherein the power controller stops power supply to the display unit upon completion of a suspending process of an operation system.

5. The printing apparatus according to claim 1,
wherein the controller acquires the information regarding the device driver after completion of the predetermined process.

6. The printing apparatus according to claim 1, wherein the interface is a USB interface.

7. The printing apparatus according to claim 6,
wherein the power supply unit supplies power to VBUS of a USB device attached to a USB interface, and the power control unit stops power supply to the removable device by stopping power supply to the VBUS.

8. The printing apparatus according to claim 1, wherein the controller executes a resuming process of the removable device in accordance with a request for shifting to the first power state, and wherein the resuming process is processing for reading out the information stored in the first memory.

9. The printing apparatus according to claim 1, wherein the controller executes a suspending process of a kernel after acquisition of status regarding the device driver is completed.

10. The printing apparatus according to claim 1, further comprising a logical gate configured to receive a control signal controlled by the power controller and power output from the power supply unit and to stop output of the electric power in accordance with the control signal.

11. A method for controlling a removable device by a printing apparatus,
the printing apparatus including
an interface to which the removable device is configured to be attached, a controller configured to acquire information regarding a device driver of the removable device, wherein the information acquired by the controller regarding the device driver is register status of hardware controlled by the device driver, a first memory configured to store the information acquired by the controller regarding the device driver in a suspending process of the device driver by the controller, and a second memory different from the first memory and configured to, upon attachment of the removable device to the interface, store information, acquired by the controller, of the removable device and of the device driver to control the removable device, the printing apparatus being operable in a first power state and in a second power state, wherein power consumption in the second power state being lower than power consumption in the first power state, the method comprising:
receiving a request for shifting the printing apparatus to the second power state from the first power state;

stopping power supply to the removable device attached to the interface in accordance with the request;

executing a predetermined process in response to a stop of power supply to the removable device, wherein the predetermined process is processing for clearing the information of the removable device and of the device driver to control the removable device stored in the second memory; and acquiring status of the device driver of the removable device to which the power supply has been stopped in accordance with the request.

12. The method for controlling a removable device by a printing apparatus according to claim 11, the printing apparatus further including a display unit, the method further comprising:
executing, after acquiring the information regarding the device driver, a suspending process of an operation system; and stopping, upon completion of the suspending process of the operation system, power supply to the display unit.

13. The method for controlling a removable device by a printing apparatus according to claim 11, further comprising stopping access to the removable device before power supply to the device is stopped.

14. The method for controlling a removable device by a printing apparatus according to claim 11, further comprising:
executing an interruption process to be performed based on the stop of power supply to the removable device, wherein the suspending process is performed after the interruption process is executed.

15. The method for controlling a removable device by a printing apparatus according to claim 11,
wherein the interface is a USB interface, and the removable device is a USB device, and stop of power supply to the removable device corresponds to stop of power supply to a VBUS of a USB device connected to the USB interface.

* * * * *